Dec. 26, 1950 D. MITCHELL 2,535,446

CARRIER COMMUNICATION SYSTEM

Filed June 16, 1948 2 Sheets-Sheet 1

INVENTOR
D. MITCHELL
BY
Earl C. Laughlin
ATTORNEY

Dec. 26, 1950 D. MITCHELL 2,535,446

CARRIER COMMUNICATION SYSTEM

Filed June 16, 1948 2 Sheets-Sheet 2

INVENTOR
D. MITCHELL
BY
Earl C. Laughlin
ATTORNEY

Patented Dec. 26, 1950

2,535,446

UNITED STATES PATENT OFFICE 2,535,446

CARRIER COMMUNICATION SYSTEM

Doren Mitchell, Martinsville, N. J., assignor to Bell Telephone Laboratories, Incorporated, New York, N. Y., a corporation of New York Application June 16, 1948, Serial No. 33,410

10 Claims. (Cl. 179—2.5)

Figure 1:
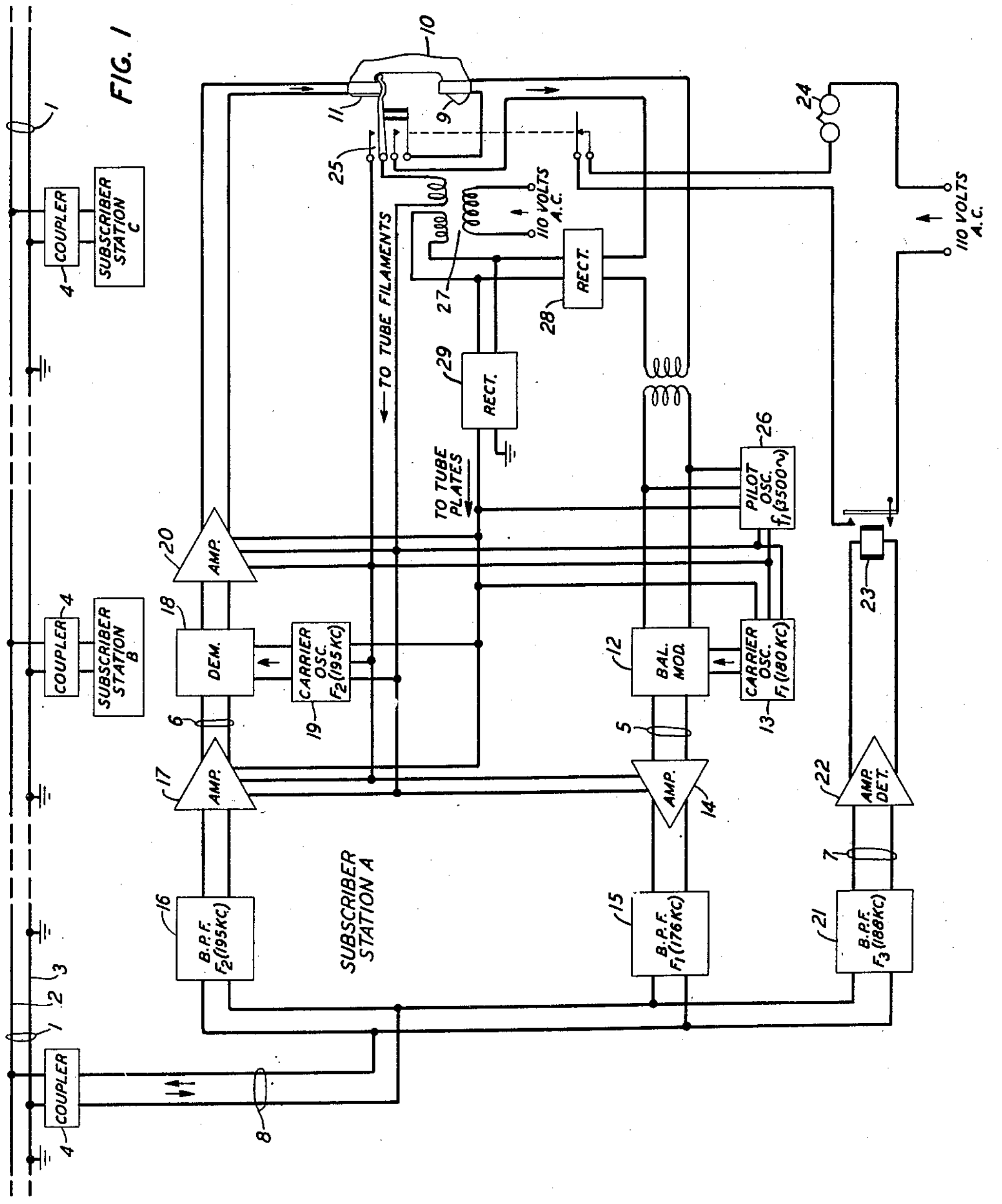

This invention relates to electric wave transmission systems and particularly to a carrier wave communication system.

The invention is specifically applicable to a system employing one or more high frequency carrier channels for supplying telephone service to a number of subscribers over a common transmission medium which may be a power or other type of transmission line or a radio transmission link. In such a system, a telephone subscriber associated with any carrier channel on the common medium may converse with the other telephone subscribers associated with the same carrier channel on a party line basis over the common medium through an individual carrier terminal for that channel, or with a telephone subscriber associated with another carrier channel on the same transmission medium or with an outside voice frequency telephone network over the common medium through the individual carrier terminal or terminals for the channels involved and an associated central switching office.

In prior art systems of this general type, it is known to utilize two electric waves of different high frequencies per channel as carriers for both the speech and calling signals, one for each direction of transmission, transmission over the common medium from the subscriber station to the carrier terminal being on a carrier of one of these frequencies and transmission in the opposite direction on a carrier of the other frequency, for central office calls; and the transmitting and receiving carrier frequencies at either the calling or called station being reversed and the transmitting carrier frequency of the carrier terminal removed from the common medium to prevent interference, for reverting (party line) calls, that is, calls between subscribers associated with the same carrier channel on the common medium. It is also known to employ three different high frequencies per channel as carriers for speech and calling signals transmitted over the common medium between the subscriber stations and the common terminal, transmission from the carrier terminal to the subscriber stations being always on one of these carrier frequencies and transmission in the opposite direction being on a second carrier frequency for central office calls and on the third carrier frequency for one of the stations on reverting calls. In these prior art systems, one or both voice sidebands and the unmodulated carrier component are transmitted over the common medium in each direction between the subscriber stations and the carrier terminal.

An object of the invention is to improve carrier wave communication systems of the above-described general type.

A more specific object is to improve this general type of carrier communication system particularly from the standpoint of signaling and supervision; economy of frequency space used; preventing false operation by noise; and facilitating conference calls between several subscribers using the same frequency allocations.

In the improved carrier communication system in accordance with the invention, a carrier wave of the same high frequency $F_1$ is employed for transmitting voice signals from each of the subscriber carrier telephone stations associated with the same carrier channel over the common transmission medium to an individual carrier terminal for that channel associated with a central office and a second carrier wave of a different high frequency $F_2$ for transmitting voice signals from that carrier terminal over the common transmission medium to each of the subscriber carrier telephone stations associated with that carrier channel, for both central office and reverting or party line calls. Double sideband with suppressed carrier is used for speech and signal transmission in one direction between each subscriber carrier station and the carrier terminal and single sideband with suppressed carrier for speech transmission in the opposite direction. A pilot frequency slightly above the voice signal range, and different for each subscriber, is sent out by each carrier subscriber, when he initiates or answers a call, over the common transmission medium to the carrier terminal, and is used at the associated central office as a switchhook or dial calling signal and for identifying the calling subscriber. Each subscriber associated with a carrier channel is called by operation of a ringer at his station by a coded wave of a third high frequency $F_3$, which may be intermediate the two carrier frequencies $F_1$ and $F_2$, sent out over the common medium from the carrier terminal under control of the central office.

Figure 2:
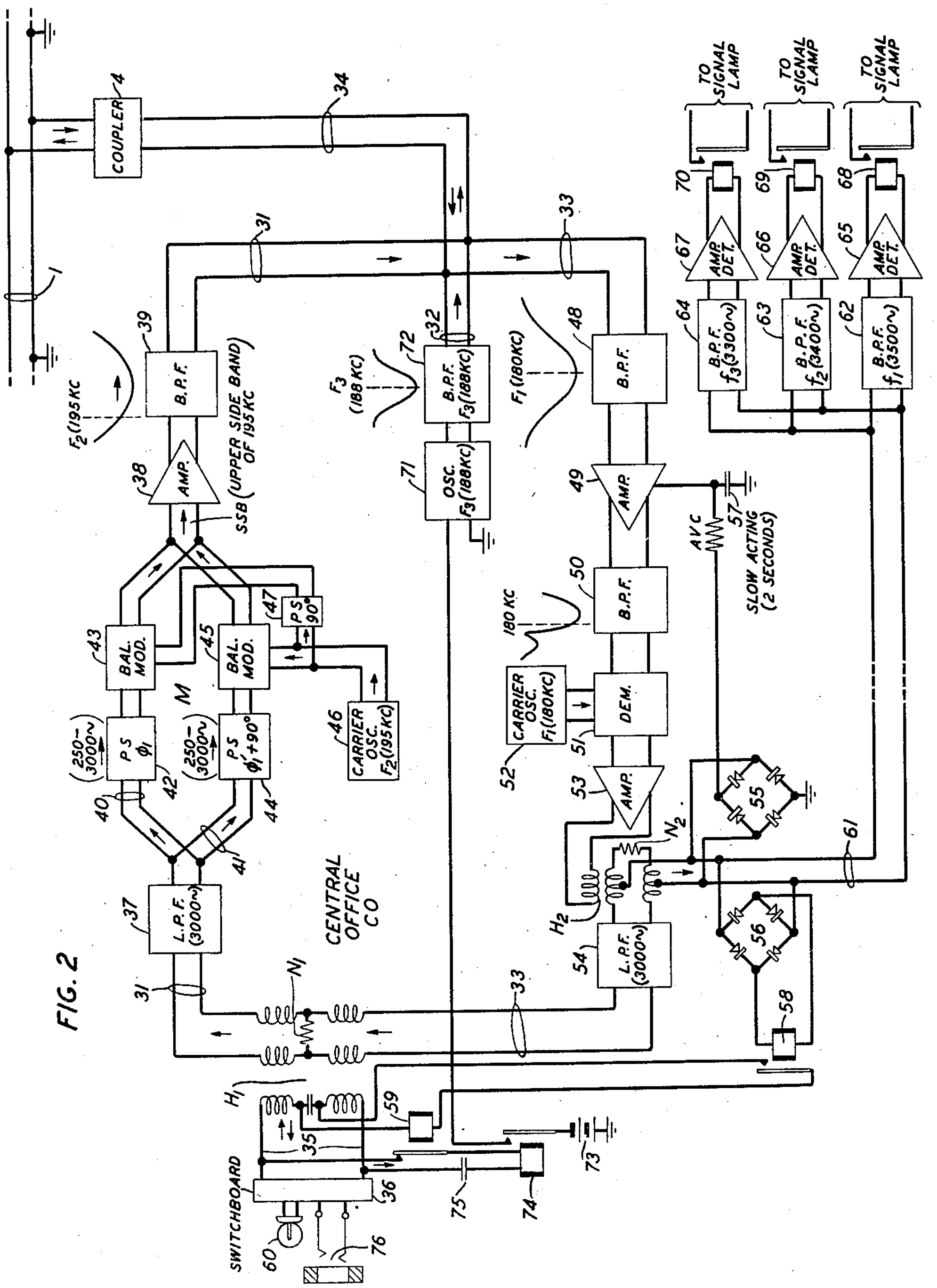

A more complete understanding of the invention will be obtained from the following detailed description when read in conjunction with the accompanying drawings in which:

Figs. 1 and 2, when placed side by side with Fig. 1 at the right, show in block schematic form a power line carrier telephone system embodying the invention. In the particular single channel carrier telephone system in accordance with the invention as show in Figs. 1 and 2 to be described, which was built and operated satisfactorily, the carrier wave used for transmission in one direction was 180 kilocycles and that in the opposite direction 195 kilocycles; the signaling frequency transmitted from the central office carrier terminal to the subscriber carrier telephone stations was 188 kilocycles and the pilot tones transmitted in the opposite direction from the individual subscriber carrier telephone stations for signaling and supervision purposes at the carrier terminal were of the frequencies 3500, 3400 and 3300 cycles, respectively.

This carrier telephone system as shown in Figs. 1 and 2 includes the transmission line 1 primarily employed for transmission and distribution of low frequency, high voltage electric power, which may be adapted for simultaneous use for high frequency carrier telephony in any suitable manner. The line 1 is shown as a single phase line consisting of one phase conductor 2 and a neutral conductor 3, the latter being grounded at a number of spaced points, for example, at each transmission pole. This type of line is commonly used in rural areas for transmitting high voltage (7.5 kilovolts), low frequency (60 cycles) electric power to electric power consumers. However, the carrier system to be described may be used as well with any type of power or other line or other transmission medium.

A plurality of subscriber two-way carrier telephone stations A, B, C . . . associated with one carrier channel of the system, that is, employing the same carrier transmitting frequencies and the same carrier receiving frequencies, and a carrier terminal station for that channel with an associated central switching office, to be referred to hereinafter as the central office CO, are bridged across the power line 1 at different points by suitable coupler arrangements 4, which may comprise condensers or filter arrangements (not shown), adapted for permitting the transmission of the high frequency carrier signals to or from the line and for substantially preventing transmission of the low frequency, high voltage power from the line into the subscriber or central office carrier terminal equipment.

Each of the subscribers' stations A, B, C . . . is identical except for the frequency of the pilot oscillations produced by a pilot oscillator at each station as will be brought out hereinafter, each comprising equipment such as illustrated in block schematic form at subscriber station A. As shown at station A, each station includes a carrier transmitting branch 5, a carrier receiving branch 6 and a signal receiving branch 7. The output of the carrier transmitting branch 5 and the inputs of the carrier receiving branch 6 and the signal receiving branch 7 are connected in parallel to a common circuit 8 which connects through the coupler arrangement 4 to the power line 1.

The transmitting branch 5 includes in order, reading from right to left: a telephone transmitter 9 which may be combined in a standard hand telephone set 10 with the telephone receiver 11 as indicated; a balanced modulator 12 and associated carrier oscillator 13 for supplying to the modulator carrier oscillations of the transmitting frequency $F_1$ (180 kilocycles); the high frequency amplifier 14; and the transmitting band-pass filter 15. The carrier receiving branch circuit 6 includes in order, reading from left to right: the receiving band-pass filter 16; the high frequency amplifier 17; the demodulator 18 and associated carrier oscillator 19 for supplying to the demodulator carrier oscillations of the frequency $F_2$ (195 kilocycles); the audio frequency amplifier 20; and the telephone receiver 11 of the standard hand telephone set 10.

The receiving signaling circuit 7 includes: the band-pass filter 21 adapted for passing the signaling frequency $F_3$ (188 kilocycles) received over the line 1 from the central office CO; amplifier-detector 22 fed from the filter 21; the slow-operate electromagnetic relay 23 adapted for energization by the detected signal output of the amplifier-detector 22; and the ringer 24 which is arranged to be supplied as shown with energizing current from a 110-volt alternating current source, which may be derived from the power line 1, or a separate power source, through closed switching contacts of the relay 23 and the closed lower switching contacts of the switchhook 25 for the hand telephone set 10 when the relay 23 is operated while the hand telephone set 10 remains on the switchhook 25.

A pilot oscillator 26 adapted for producing a single frequency tone of a frequency $f_1$ which is slightly above the voice signal band, which for station A is assumed to be 3500 cycles, is bridged across the audio frequency input to the balanced modulator 12 in the carrier transmitting branch circuit 5.

The oscillators 13 and 26 and the amplifier 14 associated with the transmitting carrier branch 5 and the oscillator 19 and amplifiers 17 and 20 associated with the carrier receiving branch 6, which may be of any suitable vacuum tube type, are normally deenergized and are adapted to be supplied as shown with suitable energizing filament current and plate voltage from a 110-volt alternating-current power source, which may be derived from the power line 1 or a separate power source, through transformer 27 or transformer 27 and rectifiers 28 and 29, respectively, by the closing of the two upper switching contacts of switchhook 25 when the hand telephone set 10 is removed from that switchhook. The amplifier-detector 22 of the signal receiving circuit 7, on the other hand, which may comprise a single hot cathode gas tube, is activated all the time so that the subscriber station set is ready to receive a ringing signal whenever necessary.

The balanced modulator 12 in the carrier transmitting branch 5, which may be of the double balanced copper oxide rectifier bridge type disclosed in the United States Patent 2,025,158 issued December 24, 1935, to F. Cowan, is adapted to combine high frequency carrier oscillations supplied to its carrier input terminals with low frequency signals applied to its signal input terminals so as to produce upper and lower sideband components of the combined waves in the modulator output circuit while suppressing therefrom the unmodulated carrier component. The demodulator 18 in the carrier receiving branch 6 may be of any suitable type for combining the carrier oscillations supplied to its carrier input terminals from the associated oscillator with signal-modulated carrier waves of the same frequency supplied to its signal input terminals so as to reproduce the modulating signal components in its output. A single vacuum tube, with an associated crystal, may be utilized to provide both oscillator and demodulator functions.

The subscriber carrier telephone stations B, C . . . differ essentially from subscriber carrier telephone station A described essentially only in the design of the pilot oscillator 26 to produce a pilot tone of different frequency $f_2$, $f_3$ . . . slightly above the voice signal band, say of 3400 cycles, 3300 cycles . . ., respectively.

The central office CO includes a carrier transmitting branch 31, a signal transmitting branch 32 and a carrier receiving branch 33. The outputs of the carrier transmitting branch 31 and the signal transmitting branch 32 and the input of the carrier receiving branch 33 are coupled in parallel to a common circuit 34 which connects through the coupler device 4 to the power line 1; and the input of the carrier transmitting branch 31 and the output of the carrier receiving branch 33 are coupled by the slightly unbalanced hybrid coil $H_1$ and associated balancing network $N_1$ to a common two-wire circuit 35 leading to the central office switchboard 36. The latter, which may be of the manual type shown or of the automatic type, is utilized for connecting the carrier subscriber stations on the power line 1 through the plug and jack arrangement 76 to any of the telephone subscribers in a voice frequency telephone plant (not shown) and for supervising the connections of the subscriber carrier telephone stations on the power line 1 with each other on a party line basis.

The carrier transmitting branch 31 includes in order, reading from left to right: a low-pass filter 37 having a cut-off at 3000 cycles; a modulating system M to be described below; a high frequency amplifier 38; and the transmitting band-pass filter 39. The modulating system M is similar to that first disclosed in the United States Patent 1,666,206, issued April 17, 1928, to R. V. L. Hartley, for suppressing the carrier component and producing a single sideband component at its output. As shown, this modulating system M comprises two modulating branches 40 and 41 connected in parallel between the low-pass filter 37 and the input of the high frequency amplifier 38, the crank 40 including a phase shifter 42 followed by a balanced modulator 43, and the branch 41 a phase shifter 44 followed by a balanced modulator 45. The phase shifters 42 and 44 may be of any suitable type such as to produce a difference in phase of 90 electrical degrees between the waves applied to the inputs of the respective following balanced modulators 43 and 45 in the paths 40 and 41, respectively. As shown, carrier oscillations of the high frequency $F_2$ (195 kilocycles) are supplied from the common carrier oscillator 46 directly to the carrier input terminals of the balanced modulator 45 in the path 41, and through the 90-degree phase shifter 47 to the carrier input terminals of the balanced modulator 43 in the path 40. The balanced modulators 43 and 45 are preferably of the double balanced copper oxide rectifier bridge type such as disclosed in the aforementioned Cowan patent.

The carrier receiving branch circuit 33 at the central office CO includes in order, reading from right to left: the receiving band-pass filter 48; the high frequency amplifier 49; the sharply selective band-pass filter 50, which is preferably of the crystal type; the demodulator 51 and associated carrier oscillator 52, similar to the demodulator 18 and associated carrier oscillator 19, respectively, at each subscriber station, for supplying to the carrier input terminals thereof carrier oscillations of the high frequency $F_1$ (180 kilocycles); the low frequency amplifier 53; and the low-pass filter 54 having a cut-off at 3000 cycles. The inputs of the two wave detectors 55 and 56, which may be of the full-wave copper oxide rectifier bridge type shown, are connected to the carrier receiving branch 33 at a point between the audio amplifier 53 and the low-pass filter 54 by hybrid coil $H_2$ and associated balancing network $N_2$ in energy transmission relation with respect to the output of that amplifier and in conjugate relation with respect to the outgoing portion of the branch 33 including filter 54. The output of the detector 55 is connected through the slow-acting resistance-condenser circuit 57 to the input of the amplifier 49 in the branch 33 to provide a backward AVC circuit for maintaining the gain in the receiving branch 33 at a suitable constant value. The output of the detector 56 feeds the operating winding of the relay 58, which in the manner to be described, controls the operation of the relay 59 and the signal lamp 60 associated with the switchboard 36.

Also connected across the carrier receiving branch 33 by the hybrid coil $H_2$ and associated balancing network $N_2$ is the input of a circuit 61 which feeds in parallel through the individual narrow band-pass filters 62, 63, 64 tuned to pass the pilot tones of frequencies $f_1$ (3500 cycles), $f_2$ (3400 cycles), $f_3$ (3300 cycles) . . . to the amplifier detectors 65, 66, 67 . . ., respectively, having their outputs connected to the operating windings of the relays 68, 69, 70 . . ., respectively, controlling the energizing circuits of different distinctive signal lamps (not shown).

The signal transmitting circuit 33 at the central office CO includes the normally deenergized oscillator 71, which, when energized, is adapted to supply signaling waves of the high frequency $F_3$ (188 kilocycles) intermediate the carrier frequency $F_1$ (180 kilocycles) and the carrier frequency $F_2$ (195 kilocycles) to the power line 1 through the band-pass filter 72 having its pass band centered at the frequency $F_3$ (188 kilocycles), as shown by the characteristic curve above the filter, and the coupling arrangement 4 in circuit 34. The energizing circuit for the signaling oscillator 71 from battery 73 is adapted to be closed by the operation of the signaling relay 74 through the series condenser 75 by 20-cycle ringing signals received over the two-wire circuit 35 from the switchboard 36 when suitable equipment thereat (not shown) is operated by the central office operator. The energizing circuit for the signaling relay 74 is arranged to be disabled by operation of the relay 59 when a direct current energizing circuit for the latter is closed by operation of the receiving control relay 58.

The various elements of the equipment at the subscriber carrier telephone stations A, B, C . . . and at the central office CO will be described more fully in the following description of the operation of the system for three typical types of calls, i. e., a call originating from someone in the regular telephone plant associated with the central office CO to one of the carrier subscriber stations A, B, C . . . on the power line; a call originating from one of the subscriber stations A, B, C . . . on the power line 1 to a subscriber in the regular telephone plant; and a reverting (party line) call between two subscriber carrier telephone stations associated with the same carrier channel on the power line.

*Call from subscriber in regular telephone plant to carrier subscriber on power line*

Suppose a subscriber in the regular voice frequency telephone plant associated with the central office switchboard 36 desires to call a subscriber associated with the power line 1, say, the subscriber associated with station A. The calling subscriber rings the central office CO in the usual manner and gives the central office operator the number to be called which includes the ringing code assigned to subscriber station A. The central office operator plugs in a switchboard jack to connect a source (not shown) of 20-cycle ringing current in the usual manner to the circuit 35 which supplies it through the condenser 75 as operating current to the signaling relay 74, and operates his signaling key (not shown) to code the supplied ringing current in accordance with the number to be called. The relay 74 will be operated to close an energizing circuit from battery 73 for the signaling oscillator 71 during the time the central office operator's key is depressed and will release to break the energizing circuit from battery 73 for the oscillator 71 each time the operator's key is released. This will cause suitable coded ringing energy of the high frequency $F_3$ (188 kilocycles) to be transmitted out from the oscillator 71 through the band filter 72 in the signal transmitting circuit 32 and the coupler arrangement 4 in the circuit 34 to the power line 1.

The coded 188-kilocycle ringing signals will be diverted at each of the subscriber stations A, B, C . . . from the power line 1 through the coupler arrangement 4 and circuit 8 to the signal receiving circuit 7 of the station in which it will be selected by the 188-kilocycle band filter 21, amplified and detected by the amplifier-detector 22 and cause alternate operation and release of the slow-operating ringing relay 23. This will cause an energizing circuit from the 110-volt alternating-current power supply at each subscriber station, including station A, to be alternately connected to and disconnected from the ringer 24 therein for corresponding time intervals to ring the bell of the latter in accordance with subscriber A's calling code. The relay 23 is made sufficiently slow-operating by suitable design to prevent false operation of the bell by short duration pulses produced by line noise or static.

The subscriber at the called station A on the power line, recognizing his coded ring, answers by removing his handset 10 from the switchhook 25 at his station which will close the upper switching contacts and open the lower switching contacts of the associated switch. The closing of the upper two switching contacts associated with the switchhook 25 will cause suitable energizing power derived from the 110-volt commercial power supply to be supplied through the transformer 27 and the rectifiers 28 and 29 to the filaments and plates of the vacuum tubes in the carrier oscillator 13, pilot oscillator 26 and amplifier 14 associated with the carrier transmitting branch 5 of station A, and in the carrier oscillator 19 and the amplifiers 17 and 20 associated with the carrier receiving branch 6 of that station. The opening of the lower switching contacts will disconnect the power supply from the ringer 24 so as to stop the ringing of the bell of the latter at subscriber station A.

The pilot tone of frequency $f_1$ (3500 cycles) then supplied by the energized pilot oscillator 26 at station A to the balanced modulator 12 in the carrier transmitting branch 5 will be combined therein with the carrier oscillations of the frequency $F_1$ (180 kilocycles) supplied from the associated carrier oscillator 13. Because the modulator 12 is balanced, the carrier component will be balanced out and only the two sideband components of the combined frequencies will appear in the output of the modulator 12 and will be amplified by the high frequency amplifier 14. The two amplified sidebands will be passed through the transmitting band-pass filter 15, the pass band of which is centered at a suitable frequency (176 kilocycles) and is wide enough to transmit both pilot and speech sidebands of the carrier frequency $F_1$ (180 kilocycles) produced at all subscriber stations A, B, C. . . . The passed two sideband components will be supplied through circuit 8 and coupler arrangement 4 to the power line 1 over which they will be transmitted to the central office CO.

At the central office CO, the two sidebands will be diverted through the coupler arrangement 4 and circuit 34 to the carrier receiving branch 33 of that office in which they will be selected by the receiving band-pass filter 48 whose pass band is centered about the frequency $F_1$ (180 kilocycles), as indicated by the characteristic curve shown above that filter. The selected sidebands will be amplified by the high frequency amplifier 49 and impressed on the crystal filter 50 sharply tuned to the frequency $F_1$ (180 kilocycles). This filter 50 has a pass band sufficiently wide to transmit all signaling frequencies used by the subscribers A, B, C . . . and a very steep attenuation characteristic above the frequency $F_1$ (180 kilocycles) as shown by the characteristic curve above that filter, so that it will trim off the unwanted (upper) sideband. The single sideband energy in the output of the filter 50 will be combined in the demodulator 51 with carrier oscillations of the frequency $F_1$ (180 kilocycles) supplied by the carrier oscillator 52 to demodulate the pilot frequency $f_1$ (3500 cycles) therefrom which will be amplified by the low frequency amplifier 53 and passed through the hybrid coil $H_2$ to the input of the low-pass filter 54 and to the inputs of the parallel-connected bridge detectors 55 and 56 and circuit 61. The portion of the pilot tone energy of frequency $f_1$ (3500 cycles) impressed on the low-pass filter 54 will be suppressed thereby because the latter will only pass frequencies below 3000 cycles. The portion of the pilot tone energy detected by the detector 55 will be fed back through the slow-acting resistance-condenser circuit 57 to the input circuit of the high frequency amplifier 49 to provide automatic control of the gain of that amplifier. The slow action provided by the resistance-condenser circuit 57 is utilized to prevent any detected speech energy in the output of that detector from having any appreciable effect on the gain of the amplifier 49.

The detected pilot tone energy of frequency $f_1$ (3500 cycles) in the output of the other detector 56 will cause operation of the associated signal relay 58 to close a direct-current energizing circuit through the winding of relay 59 and the two sides of the two-wire circuit 35 to the signal lamp 60 in the operator's cord circuit associated with switchboard 36 causing that lamp to light up to indicate to her that the call has been answered, and the operation of relay 59 to open the energizing circuit for the ringing relay 74. The consequent release of the latter relay will break the energizing circuit for the signaling oscillator 71 at the central office CO so as to stop the transmission of the ringing current of frequency $F_3$ (188 kilocycles) therefrom over the power line 1.

The portion of the received pilot tone of frequency $f_1$ (3500 cycles) diverted into the circuit 61 will be selected by the narrow band filter 62 therein tuned to that frequency, amplified and detected in the amplifier-detector 65 and cause operation of the relay 68 in the output thereof to close the associated circuit to light up a distinctive lamp (not shown) to indicate to the central office operator that station A has answered the call.

The calling subscriber in the telephone plant and the called subscriber at station A on the power line 1 may then converse with each other in the following manner. When the subscriber at station A talks into his transmitter 9, his voice signals along with the pilot tone of frequency $f_1$ (3500 cycles) from pilot oscillator 26 will be combined in the balanced modulator 12 in the carrier transmitting branch 5 at the station, with the carrier oscillations of frequency $F_1$ (180 kilocycles) from carrier oscillator 13 to produce upper and lower sideband components while suppressing the carrier component. The produced two sideband components will be transmitted out over the power line 1 to the central office CO in a manner similar to that described for the pilot tone sidebands.

At the central office CO, the received sideband components from station A will be diverted through coupler device 4 and circuit 34 into the receiving carrier branch 33 in which they will be selected by the receiving band filter 48, amplified in the amplifier 49 and impressed on the crystal band filter 50 which will trim off the unwanted (upper) sideband component and pass the other (lower) sideband component to the demodulator 51 in which it will be combined with the carrier oscillations of the frequency $F_1$ (180 kilocycles) from the local carrier source 52 to demodulate the speech and the pilot tone of the frequency $f_1$ (3500 cycles) from the applied sideband. The resulting waves will be amplified by the low frequency amplifier 53 and the energy of the amplified waves divided by the hybrid coil $H_2$ between the input of the 3000-cycle low-pass filter 54 in the output of the carrier receiving branch 33, the inputs of the detectors 55 and 56 and the input of the circuit 61. The low-pass filter 54 in the main carrier receiving branch 33 will suppress the pilot frequency component and pass subscriber A's voice signals through the hybrid coil $H_1$ to circuit 35. They will be passed over that circuit to the switchboard 36 and through that switchboard and the plug and jack arrangement 76 to the connected line of the calling subscriber in the telephone plant over which it will pass to his receiver.

The unbalance current passing through the hybrid coil $H_1$ to the input of carrier transmitting branch 31 of the central office will pass through low-pass filter 37 to the modulator M. The modulator M, operating in the manner to be described in detail below in connection with the calling subscriber's voice currents, will combine the applied unbalance currents with a carrier wave of frequency $F_2$ (195 kilocycles) and produce a single sideband of the combined waves. This sideband in amplified form will be transmitted out over the power line 1 to subscriber station A and will appear in the receiver 11 of the carrier receiving branch 6 of that station as sidetone.

The pilot tone energy components passing through the hybrid coil $H_2$ to the detectors 55 and 56 and the circuit 51 at the central office CO in the manner previously described will maintain the gain of the amplifier 44 properly adjusted and continue operation of the control relays 58, 59 and 68 to light up the associated signal lamps, and disable the signaling relay 74.

The voice signals of the calling subscriber in the telephone plant will pass from his telephone transmitter over the associated subscriber line to the central office CO where they will pass through the switchboard 36 and circuit 35 to the hybrid coil $H_1$ which will impress them on the input of the carrier transmitting branch 31. The voice signals passing through the 3000-cycle low-pass filter 37 in that branch will be divided between the branches 40 and 41 of the modulating system M. The energy portion impressed on branch 40 will pass through the phase network 42 to the input of the balanced modulator 43 and the other energy portion will pass through the phase network 44 in branch 41 to the input of balanced modulator 45 shifted in phase 90 electrical degrees with respect to the waves applied to balanced modulator 43 due to the relative design of the two phasing networks. The applied waves are combined in the modulators 43 and 44, respectively, with the carrier oscillations of frequency $F_2$ (195 kilocycles) from the associated carrier oscillator 46, the carrier oscillations supplied to balanced modulator 43 being 90 degrees out of phase with respect to those supplied to the balanced modulator 45 due to the effect of the 90-degree phase shifter 47 in the carrier supply circuit modulator 43. The outputs of the two balanced modulators 43 and 45 are then combined in the input of the high frequency amplifier 38 in the transmitting carrier branch 31, which, in the manner described in the aforementioned Hartley patent, results in the cancellation of the upper sideband components and the addition of the two lower sideband components with suppression of the carrier components. The resulting single sideband energy will be then amplified by the amplifier 38 and passed by the transmitting band-pass filter 39 whose pass band includes at an intermediate point the frequency $F_2$ (195 kilocycles), and the coupler arrangement 4 in the circuit 34 to the power line 1 over which it will be transmitted to each of the subscriber stations A, B, C . . .

At each of the stations A, B, C . . . the received single sideband energy representing the calling subscriber's speech will be diverted through the coupler arrangement 4 into the carrier receiving branch circuit 6 in which it will be selected by the receiving band-pass filter 16 the pass band of which is centered at the frequency $F_2$ (195 kilocycles). However, because of the non-energized conditions of the amplifier 17 in the carrier receiving branch of all the subscribers' stations except station A at which the handset 10 is off the switchhook 25, the selected single sideband component will be effective only at station A. The single sideband energy component in the output of the filter 16 in the receiving branch 6 of station A will be amplified by the amplifier 17 and the amplified waves combined in the demodulator 18 with the carrier oscillations of the frequency $F_2$ (195 kilocycles) supplied thereto from the associated carrier oscillator 19 to demodulate the calling subscriber's voice signals. The demodulated signal waves of the calling subscriber will be amplified by the audio frequency amplifier 20 and passed to the receiver 11 so that they will be heard by the subscriber A.

When the subscriber at station A hangs up his handset 10, the switching contacts of the switchhook 26 return to their normal conditions causing the carrier and pilot oscillators and the amplifiers at his station to be deenergized. The resultant removal of the pilot tone of the frequency $f_1$ (3500 cycles) from the power line 1 with the consequent release of relays 58, 59 and 59 at the central office CO will break the direct-current continuity at that office so that the central office operator will regain supervision over the system.

*Call from a subscriber on power line to regular telephone plant*

Assume that a subscriber associated with one carrier channel on the power line 1 for example, the subscriber A, wishes to talk to a subscriber in the regular telephone plant. By lifting his handset 10 from the switchhook 25, subscriber A causes the oscillator and amplifier equipment at his station to be energized and two signal sideband components produced by combination of the pilot tone of frequency $f_1$ (3500 cycles) from oscillator 26 with the carrier of frequency $F_1$ (180 kilocycles) from oscillator 13 in balanced modulator 12 to be sent out over the power line 1 to the carrier receiving branch 33 to the central office CO in the manner previously described. One of the two received sideband components will be cut off by crystal filter 50 in the carrier receiving branch of central office CO and the other will be demodulated to reproduce the pilot tone $f_1$ (3500 cycles). The demodulated tone will cause operation of relay 58 which in turn will cause signal lamp 60 at switchboard 36 to be lighted up and relay 59 to operate to disable ringing relay 56, as well as to provide operation of another signal lamp identifying subscriber A and providing automatic control of the receiving branch gain as previously described.

When the central office operator answers the call, the subscriber at station A talks into his transmitter 9 to tell the operator which number he wishes to call. The upper and lower sideband components produced by combining his speech signals and the pilot tone frequency $f_1$ (3500 cycles) with the carrier oscillations of frequency $F_1$ (180 kilocycles) will be sent out over the power line 1 to the carrier receiving branch 33 at the central office CO, in which one sideband is suppressed and the other demodulated in the manner previously described for the pilot tone. A portion of A's demodulated voice current will be transmitted through the low-pass filter 54, hybrid coil $H_1$, circuit 35 and switchboard 36 to the central office operator's telephone receiver (not shown). Another portion will pass through hybrid coil $H_1$ to the carrier transmitting branch 31 in which it will be modulated in the modulating system M with a carrier wave of frequency $F_1$ (195 kilocycles) in such manner as to produce a sideband component only of the combined waves which will be transmitted back to subscriber A's receiver 11 as sidetone in the manner previously described.

The operator will then ring the called subscriber in the regular telephone plant in the usual manner, and, when that subscriber answers, completes the connection of the latter's line through the switchboard 36, circuit 35, the carrier transmitting and receiving branches of the central office and the power line 1 to the subscriber station A. The connected subscribers will then converse with each other in the manner similar to that previously described above for a call initiated by the subscriber in the regular telephone plant.

*Call between subscribers associated with the same carrier channel on the power line*

To make an interparty line or reverting call, say to a subscriber at station B, the subscriber at station A takes his handset 10 off the switchhook 25 to send out his pilot tone of frequency $f_1$ over the power line 1 to call the central office operator at the central office CO, and, when the latter answers, asks her to ring the other party (station B) in the manner previously described. Subscriber A then hangs up his handset 10 thereby causing the oscillator and amplifier equipment at that station to be deenergized, and the operator at the central office CO then applies 20-cycle ringing current suitably coded to her ringing relay 74 the energizing circuit of which had been previously enabled with the release of relays 58 and 59 in consequence of the removal of the supply of pilot tone of frequency $f_1$ from the power line 1 when subscriber A replaced his handset on the switchhook. The alternate operation and release of relay 74 in response to the coded ringing current will effectively turn the signal oscillator 71 at the central office on and off for corresponding time intervals so that suitably coded signaling current of the frequency $F_3$ (188 kilocycles) is sent out through filter 72 in circuit 32 and circuit 34 to the power line 1.

The coded signaling current of frequency $F_3$ (188 kilocycles) will be diverted through coupler device 4 and circuit 8 into the signal receiving branch 7 at all the subscriber stations in which it will cause operation of the ringer 24 therein in the manner previously described. When the subscriber at station B, recognizing his coded ring, answers by lifting his handset 10 from switchhook 25, the oscillators and amplifiers associated with his carrier transmitting branch 5 and carrier receiving branch 6 are energized, and the energizing circuit for ringer 24 at station B will be disabled due to the opening of the lower contacts of the switchhook 25 to silence the bell at that station. The pilot tone of frequency $f_2$ (3400 cycles) from the pilot oscillator 26 at station B will then be combined in modulator 12 with carrier oscillations of frequency $F_1$ (180 kilocycles) from carrier oscillator 13 in such manner as to produce upper and lower sideband components of the combined waves while suppressing the carrier component. The two sideband components are transmitted out over the power line 1 to the carrier receiving branch 33 of the central office CO and, in a manner similar to that previously described for the pilot tone of frequency $f_1$ sent from station A, will produce operation of the relay 58 associated with that branch causing the signal lamp 60 to be lighted up to indicate to the central office operator that the subscriber at station B has answered, and operation of relay 59 to disable the energizing circuit for the ringing relay 74 at the central office thereby disabling the oscillator 71 so as to cut off the supply of ringing current of frequency $F_3$ (188 kilocycles) from the power line 1. When the ringing stops at station A indicating that subscriber B has answered, the subscriber at station A takes his handset 10 off the switchhook 25 and the circuits are now in condition for subscribers A and B to talk to each other over the power line 1 through the central office CO, the demodulated voice signals of each subscriber in the output of the carrier receiving branch 33 at the carrier terminal passing by unbalance through hybrid coil $H_1$ into the carrier transmitting branch 31 in which it is modulated with the carrier oscillations of frequency $F_2$ (180 kilocycles) and one sideband of the combined waves transmitted out over the power line 1 to the receiver 11 in the other subscriber station in the manner previously described.

With the handsets 10 off the switchhook at both of these stations A and B, the two pilot tones of frequencies $f_1$ (3500 cycles) and $f_2$ (3400 cycles) are both being transmitted over the power line 1 but this will not result in objectionable interference since these two pilots are slightly separated in frequency (by 100 cycles in this case). Since the unmodulated carriers of frequency $F_1$ (180 kilocycles) and $F_2$ (195 kilocycles) are suppressed due to the use of a balanced modulator in the carrier transmitting branches of both stations, there will be no audible beat note. Also, any beat note between the two pilot tones will be extremely weak for the reason that the demodulation is mainly due to the $F_1$ (180 kilocycles) signaling oscillations from the oscillator 13 at the central office.

The demodulated pilot tones of frequencies $f_1$ (3500 cycles) and $f_2$ (3400 cycles) appearing in the input of the circuit 61 at the central office CO while the handset 10 is off the switchhook 25 at stations A and B, will be selectively transmitted through filters 62 and 63, respectively, and will be amplified and selected in the following amplifier-detectors 65 and 66, respectively, causing the operation of relays 68 and 69, respectively, to complete energizing circuits for separate distinctive signal lamps (not shown) to identify the subscribers involved in the call to the central office operator. Similarly, if the subscriber at station C should lift his handset from the switchhook to initiate or answer a call, or to get in on a conference call between two or more others of the subscriber stations A, B, C. . . ., this will cause his pilot frequency of frequency $f_3$ (3300 cycles) to be sent out to the central station CO. The demodulated pilot tone of that frequency entering circuit 61 at the central office CO will be selectively transmitted through filter 64, amplified and detected by the following amplifier-detector 67 and cause the operation of the associated relay 70 to operate the associated distinctive signal lamp to indicate to the central office operator that station C is involved in the call.

At the end of the conversation, each of the subscribers involved in the party line call will replace his handset 10 on the switchhook 25 at his station, which will cause the oscillator and amplifier equipment at these stations to be de-energized so that the transmission of the pilot tones of frequencies $f_1$ (3500 cycles), $f_2$ (3400 cycles) . . . from the respective subscribers stations over the power line 1 will stop. This will cause the relays 58 and 59 at the central office CO to be released with the consequent extinguishment of the signal lamp 60 in that office indicating to the operator that the line 1 is free and the enablement of the connections to signaling relay 74 so that the central office operator can call any subscriber station on power line 1. Thus, conference connections between any number of the subscribers associated with the carrier channel can be handled without any additional control arrangements.

The carrier system of the invention as described above has the following new features and advantages: (1) The use of different frequencies slightly above the voice band to identify subscribers on the party line as well as to provide the necessary signaling and control operations at the central office; (2) the single sideband method of operation used has certain fundamental advantages as compared to the use of double sideband transmission with transmission of the unmodulated carrier in that it makes possible conference calls among a number of subscribers using the same frequency allocations, since no carrier is transmitted and thus there is no beat note of appreciable energy content; (3) there is a noise advantage due to the use of single sideband amounting in the particular system described and illustrated to three decibels from the subscriber stations to the central office and nine decibels in the opposite direction. Only three decibels are obtained in the direction from the subscriber to the central office since both sidebands are transmitted in that direction and the unwanted sideband is eliminated at the central office. This was done for the purpose of permitting the use of cheaper filters at the subscriber stations, thus reducing the cost of the system; and (4) another fundamental advantage is the use of less frequency space due to the use of only two frequency allocations for talking.

The invention has been described and illustrated as applied to only one carrier channel on the common medium, but it is apparent that a number of different channels may be operated on the same medium by the assignment of two different carrier frequncies for each channel and an intermediate frequency for signaling in one direction, in which case separate carrier terminals associated with the same or different central switching offices would be employed for each channel. In a system so modified, the apparatus at the subscriber stations and the carrier terminals and associated central office for the additional channels may be identical with those in the system illustrated and described above for one channel, except for the changes necessitated in the carrier and pilot tone oscillators and filters due to the use of the different frequencies for the additional channels. Other changes in the circuits and equipment illustrated and described which are within the spirit and scope of the invention will occur to persons skilled in the art.

What is claimed is:

1. In combination with a carrier telephone system comprising a wave transmission medium and a plurality of subscriber carrier telephone stations and a common carrier terminal having an associated central switching office, connected over said medium, said subscriber stations and said carrier terminal including means for enabling the transmission in opposite directions therebetween over said medium of voice signals on carrier waves of respectively different high frequencies; manually operable means at each subscriber station for conditioning the station for transmitting a call and for sending out a pilot tone of a frequency slightly above the voice frequency range and different for each station over said medium to said carrier terminal and means including means at said carrier terminal responsive to the pilot tone received thereat over said medium for indicating the call at said associated central office and for identifying the calling subscriber station thereat.

2. In a carrier telephone system comprising a transmission medium, a plurality of subscriber carrier telephone stations coupled to said medium at different points and a common carrier terminal with an associated central switching office, coupled to said medium at a terminal point, each of said subscriber stations including means for sending out voice signals modulated on a carrier wave of one high frequency from that subscriber station over said medium to the common carrier terminal and said common carrier terminal including means for sending out voice signals modulated on a carrier wave of a second high frequency from that carrier terminal over said medium to the subscriber stations, for both calls between one of said subscriber carrier telephone stations and the central office or other subscriber stations through that office and party-line calls between said subscriber carrier telephone stations; manually operable means at each subscriber carrier telephone station for conditioning the station for transmitting a call and for sending out a pilot tone of a frequency slightly above the voice signal frequency range and different for each subscriber station modulated on a carrier wave of said one frequency over said medium to said carrier terminal, means at said carrier terminal for demodulating the pilot tone-modulated carrier waves received over said medium, call signal means at said central office operatively responsive to the demodulated pilot tone energy at said carrier terminal, a plurality of switching devices at said carrier terminal respectively operatively responsive to a different one of the pilot tones of different frequency received from the respective subscriber stations and a plurality of distinctive signal devices at said central office respectively responsive to operation of a different one of said switching devices at said carrier terminal to identify the calling subscriber station.

3. A carrier telephone system comprising a wave transmission medium and a plurality of subscriber carrier telephone stations and a common carrier telephone terminal with an associated central switching office, coupled to said medium, each of said subscriber stations comprising a carrier transmitting branch and a carrier receiving branch, said carrier transmitting branch including one source of carrier waves of one high frequency which is the same for all subscriber stations, a second source of pilot waves of a frequency slightly above the voice frequency range and different for each subscriber station, means for modulating a carrier wave of said one frequency from said one source with the voice signals of the local subscriber and with the pilot wave from said second source and for sending both sideband components only of the resulting combination products out over said medium, said carrier receiving branch including means for selectively receiving and demodulating a signal-modulated carrier wave of a second high frequency received over said medium and for reproducing the demodulated voice signals, said common carrier terminal comprising a second carrier transmitting branch and a second carrier receiving branch, said second carrier receiving branch including means for selecting the modulated carrier wave of said one frequency received over said medium and for demodulating one signal sideband component therefrom, said second carrier transmitting branch including a second source of carrier waves of said second frequency, means for supplying signals received from said central office and the demodulated voice signal output of said second carrier receiving branch to the input of said second carrier transmitting branch, and means for modulating said carrier waves of said one frequency from said second source with the signals supplied to the input of said second carrier transmitting branch and for sending one signal sideband component only of the resulting modulation products out over said medium, and means including means at said carrier terminal responsive to the demodulated pilot wave output of said second carrier receiving branch for indicating a call at said central office and for identifying the calling subscriber station thereat.

4. The carrier telephone system of claim 3, in which said common carrier terminal also includes means under control of said central office for generating and sending out over said medium a signaling wave of a third high frequency intermediate the frequencies of said one and said second high frequency carrier waves coded in accordance with the ringing code of the subscriber station to be called, and each of said subscriber stations includes means for selectively receiving and detecting the coded signaling wave received over said medium, a ringer responsive to the detected coded signaling wave and means under control of the local subscriber for disabling said ringer.

5. The carrier telephone system of claim 3, in which said carrier terminal includes other means under control of said central office for sending out over said medium to said subscriber stations a signaling wave of a third high frequency intermediate the frequencies of the transmitting and receiving carrier waves at the terminal suitably coded in accordance with the ringing code of the subscriber station to be called and means responsive to the demodulated pilot tone energy at the terminal to disable said other means, and each of said subscriber stations includes ringing means responsive to the coded signaling wave of said third high frequency received over said medium and means responsive to the initiation of a call at that subscriber station for disabling said ringing means thereat.

6. The carrier telephone system of claim 3, in which said carrier terminal includes means responsive to the demodulated pilot tone energy to maintain the gain of the receiving branch thereat at a suitably constant value.

7. In a party line carrier telephone system, three or more subscribers' stations, a central station, a line interconnecting said stations, a carrier transmitter always operating on a carrier frequency F1 at each subscriber station for enabling speech to be transmitted therefrom over said line to said central station on a call involving that subscriber station, a voice frequency termination for said line at said central station, a detector at said central station for detecting speech waves from the waves received over said line from the carrier transmitters of said subscribers' stations, a carrier transmitter at said central station for enabling speech to be transmitted on a carrier frequency F2 from that station to all of said subscribers' stations, and speech input means at said central station to impress on said carrier transmitter thereat speech waves received from said voice frequency termination and the detected speech waves received from said detector for transmission on said carrier frequency F2.

8. A system according to claim 7 in which the carrier transmitter at each subscriber station includes means for transmitting both upper and lower side bands of the speech modulated wave while the carrier transmitter at said central station includes means for suppressing transmission of one of the two side bands of the speech modulated wave sent out from that station.

9. A system according to claim 7 in which a source of signal waves of a different respective frequency is provided at each subscriber station for identifying that station, the last mentioned waves having frequencies in the audible range outside the essential speech frequency band, means at each subscriber station operable at the will of the subscriber thereat for applying signal waves from said source thereat to the carrier transmitter thereat for transmission to said central station, separate signaling means at the central station for the different subscriber stations, respectively selectively responsive to the signal waves of a different one of the respective frequencies from the subscribers' stations, means at the central station to detect the signal waves transmitted from any subscriber station and to apply the detected signal waves to the respective signaling means responsive to its frequency for operation of the latter to identify the subscriber station transmitting and means to prevent waves of signal wave frequencies from entering said voice frequency termination or said speech input means.

10. In a carrier telephone system, a transmission path, three or more subscribers' stations connected thereto, a terminal station also connected thereto, each subscriber's station having a carrier transmitting branch and a carrier receiving branch, a carrier wave source of the same frequency included in each carrier transmitting branch, each carrier receiving branch being selective of a second carrier frequency which is the same for all stations but different from the frequency of the carrier wave sources in said transmitting channels, means at each subscriber station for modulating the carrier waves in its transmitting branch by speech and by a pilot tone of a frequency slightly above the voice frequency range and different for each subscriber station, for transmission to said terminal station and means at said terminal station for receiving said waves so modulated, for detecting the speech and pilot tone modulations therefrom, for retransmitting the detected voice modulations as modulations of a carrier wave of said second frequency over said transmission line to all of said stations and for utilizing the detected pilot tone modulations to identify by their frequency the subscriber stations involved in a call.

DOREN MITCHELL.

REFERENCES CITED

The following references are of record in the file of this patent:

UNITED STATES PATENTS

| Number | Name | Date |
|---|---|---|
| 2,202,474 | Vroom | May 28, 1940 |
| 2,294,905 | Honaman | Sept. 8, 1942 |
| 2,421,727 | Thompson | June 3, 1947 |
| 2,430,471 | Lang | Nov. 11, 1947 |
| 2,440,239 | Almquist | Apr. 27, 1948 |
| 2,440,277 | Kurithof | Apr. 27, 1948 |